(12) United States Patent
Santinanavat et al.

(10) Patent No.: US 8,381,760 B2
(45) Date of Patent: Feb. 26, 2013

(54) STEPPER MOTOR VALVE AND METHOD OF CONTROL

(75) Inventors: Michael C. Santinanavat, St. Louis, MO (US); William P. Butler, St. Louis, MO (US); Jagdish Atri, St. Louis, MO (US); Ryan Jensen, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 1045 days.

(21) Appl. No.: 12/172,444

(22) Filed: Jul. 14, 2008

(65) Prior Publication Data

US 2010/0009303 A1    Jan. 14, 2010

(51) Int. Cl.
F16K 31/12    (2006.01)

(52) U.S. Cl. ............... 137/487.5; 251/30.05; 251/30.02

(58) Field of Classification Search ............... 251/30.01, 251/30.02, 30.05, 129.01, 129.11, 30.04, 251/129.12; 137/485, 487.5; 700/281, 282
See application file for complete search history.

(56) References Cited

U.S. PATENT DOCUMENTS

| | | | | |
|---|---|---|---|---|
| 2,572,175 | A | * | 10/1951 | McPherson ................ 251/30.05 |
| 3,721,263 | A | * | 3/1973 | Banes ........................... 137/495 |
| 3,800,823 | A | * | 4/1974 | Visos et al. ................ 137/489.5 |
| 4,265,270 | A | | 5/1981 | Satoh |
| 4,298,943 | A | | 11/1981 | Tompson et al. |
| 4,574,228 | A | | 3/1986 | Blue et al. |
| 4,637,429 | A | | 1/1987 | Dietiker et al. |
| 4,684,842 | A | * | 8/1987 | Maruno et al. ........... 310/316.01 |
| 4,906,910 | A | | 3/1990 | Tanuma et al. |
| 4,951,549 | A | * | 8/1990 | Olsen et al. ................ 91/363 R |
| 4,951,705 | A | * | 8/1990 | Carey et al. ................ 137/487.5 |
| 4,976,459 | A | * | 12/1990 | Lynch ............................ 236/11 |
| 5,118,072 | A | * | 6/1992 | Sakamoto et al. ......... 251/30.02 |

(Continued)

FOREIGN PATENT DOCUMENTS

| | | |
|---|---|---|
| DE | 297 08 361 U1 | 9/1997 |
| EP | 0062854 | 10/1982 |

(Continued)

OTHER PUBLICATIONS

Extended European Search Report and Written Opinion dated Sep. 3, 2012 issued in European Application No. 09165412.9 (now published as EP2146145); 5 pgs.

(Continued)

*Primary Examiner* — Eric Keasel
*Assistant Examiner* — Matthew W Jellett
(74) *Attorney, Agent, or Firm* — Harness, Dickey & Pierce, P.L.C.

(57) ABSTRACT

A stepper-motor gas valve control is disclosed that includes a main diaphragm in a chamber that controllably displaces a valve relative to an opening in response to changes in pressure, to adjust fuel flow through the valve. A servo-regulator diaphragm is provided to regulate flow to the main diaphragm, to thereby control the rate of fuel flow. A stepper motor is configured to move in a stepwise manner to displace the servo-regulator diaphragm, to control fluid flow to the main diaphragm. A controller mounted on the stepper-motor regulated gas valve control receives and converts an input control signal from a heating system to a reference value between 0 and 5 volts, and selects a corresponding motor step value. The control responsively moves the stepper-motor in a step wise manner to displace the servo-regulator diaphragm and thereby regulates the rate of fuel flow through the valve.

24 Claims, 5 Drawing Sheets

U.S. PATENT DOCUMENTS

| | | | |
|---|---|---|---|
| 5,202,951 A | 4/1993 | Doyle | |
| 5,215,115 A * | 6/1993 | Dietiker | 137/492.5 |
| 5,234,196 A | 8/1993 | Harris | 251/328 |
| 5,316,263 A * | 5/1994 | Mino | 251/129.05 |
| 5,329,966 A * | 7/1994 | Fenimore et al. | 137/613 |
| 5,359,271 A * | 10/1994 | Husher | 318/696 |
| 5,413,141 A * | 5/1995 | Dietiker | 137/489 |
| 5,435,343 A | 7/1995 | Buezis | |
| 5,485,070 A | 1/1996 | Tominaga | |
| 5,579,743 A * | 12/1996 | Kadowaki | 123/568.24 |
| 5,601,071 A | 2/1997 | Carr et al. | |
| 5,632,614 A | 5/1997 | Consadori et al. | |
| 5,783,939 A * | 7/1998 | Lippmann et al. | 324/154 R |
| 5,819,721 A | 10/1998 | Carr et al. | |
| 5,899,434 A | 5/1999 | Nishimura | |
| 6,000,622 A | 12/1999 | Tonner et al. | |
| 6,060,857 A | 5/2000 | Summerland | |
| 6,170,507 B1 | 1/2001 | Dalton et al. | |
| 6,283,145 B1 * | 9/2001 | Fenn | 137/489 |
| 6,460,567 B1 | 10/2002 | Hansen, III et al. | |
| 6,655,408 B2 * | 12/2003 | Linthorst | 137/487.5 |
| 6,658,372 B2 | 12/2003 | Abraham et al. | |
| 6,666,676 B2 | 12/2003 | Rodriguez-Rodriguez et al. | |
| 6,705,342 B2 | 3/2004 | Santinanavat et al. | |
| 6,705,533 B2 | 3/2004 | Casey et al. | |
| 6,748,977 B2 | 6/2004 | Berto | |
| 6,758,208 B2 | 7/2004 | Giérula et al. | |
| 6,853,162 B2 | 2/2005 | Betts et al. | |
| 7,002,265 B2 | 2/2006 | Potega | |
| 7,090,486 B2 | 8/2006 | Lochschmied | |
| 7,101,172 B2 | 9/2006 | Jaeschke | |
| 7,104,275 B2 | 9/2006 | Dille | |
| 7,264,223 B2 * | 9/2007 | Fukano et al. | 251/129.07 |
| 2004/0108829 A1 * | 6/2004 | Betts et al. | 318/696 |
| 2005/0229976 A1 * | 10/2005 | Kao et al. | 137/501 |
| 2005/0254948 A1 * | 11/2005 | Koch et al. | 416/144 |
| 2006/0000509 A1 * | 1/2006 | Pozniak | 137/487.5 |
| 2006/0183066 A1 * | 8/2006 | Eichenlaub | 431/326 |
| 2008/0153045 A1 * | 6/2008 | Deng | 431/76 |

FOREIGN PATENT DOCUMENTS

| | | |
|---|---|---|
| EP | 1798456 | 6/2007 |
| WO | 2008/012849 | 1/2008 |

OTHER PUBLICATIONS

International Search Report And Written Opinion from PCT International Application No. PCT/US2012/044851 dated Nov. 28, 2012; 7 pgs.; which claims priority to U.S. Appl. No. 13/181,205, filed Jul. 12, 2011 which is a continuation-in-part of the instant application.

* cited by examiner

STEPPER MOTOR VALVE AND METHOD OF CONTROL

FIELD

The present disclosure relates to systems for control of an appliance incorporating a flame, and more particularly relates to valve control of a fuel to such an appliance.

BACKGROUND

The statements in this section merely provide background information related to the present disclosure and may not constitute prior art.

Typically, appliances that utilize a fuel such as natural gas (i.e., methane), propane, or similar gaseous hydrocarbons, supply a burner with a pressurized gas input regulated via a main valve. Ordinarily, the burner generates a substantial amount of heat such that the valve supplies fuel for operation of the burner only as needed. Yet, there are occasions when it is desirable to adjust the outlet pressure regulation of the burner supply valve of a gas appliance. These include changes in mode (i.e., changes in the desired intensity of the flame) and changes in the fuel type (e.g., a change from propane to methane). Published International Patent Application PCT/US 1999/028982, published as WO2001/031257 May 3, 2001, to Bauman, suggests a modulating solenoid approach typically used to vary valve positioning of a gas appliance. While such a valve approach has been used for some time with satisfactory results, the introduction of an entirely new valve design is likely to introduce severe regulatory difficulties. Proof of safe operation of a new approach to valve design would require substantial development costs and testing.

SUMMARY

Further areas of applicability will become apparent from the description provided herein. It should be understood that the description and specific examples are intended for purposes of illustration only and are not intended to limit the scope of the present disclosure.

According to one aspect of the present disclosure, one or more embodiments of a stepper-motor controlled gas valve control are provided. In one embodiment, the stepper-motor regulated gas valve control is adaptable for a number of different fuel-fired furnace designs, and includes a main diaphragm in a main diaphragm chamber that controllably displaces a valve relative to a valve opening. The main diaphragm displaces the valve in response to changes in pressure in the main diaphragm chamber, to thereby permit adjustment of the flow of fuel through the valve opening. The stepper-motor regulated gas valve control further includes a servo-regulator diaphragm configured to regulate fluid flow to the main diaphragm chamber to thereby control the rate of fuel flow through the valve. A stepper motor is configured to move in a stepwise manner to displace the servo-regulator diaphragm for regulating fluid flow to the diaphragm chamber, to thereby regulate the rate of fuel flow through the valve opening. The stepper-motor regulated gas valve control includes a controller mounted on the stepper-motor regulated gas valve control, which receives an input control signal ranging from 0 to 180 milliamps, and to convert a signal value of between 0 and 180 milliamps to a proportionally corresponding reference value of between 0 and 5 volts. The controller may include a look-up table with a set of motor step values that correspond to a number of reference values between 0 and 5 volts, wherein the control circuit is configured to select a motor step value from the look up table that corresponds to the reference value obtained from the input control signal. The control responsively moves the stepper-motor in a step wise manner to the selected motor step value, to displace the servo-regulator diaphragm and thereby regulate the rate of fuel flow through the valve opening.

DRAWINGS

The drawings described herein are for illustration purposes only and are not intended to limit the scope of the present disclosure in any way.

DETAILED DESCRIPTION

Figure 1:
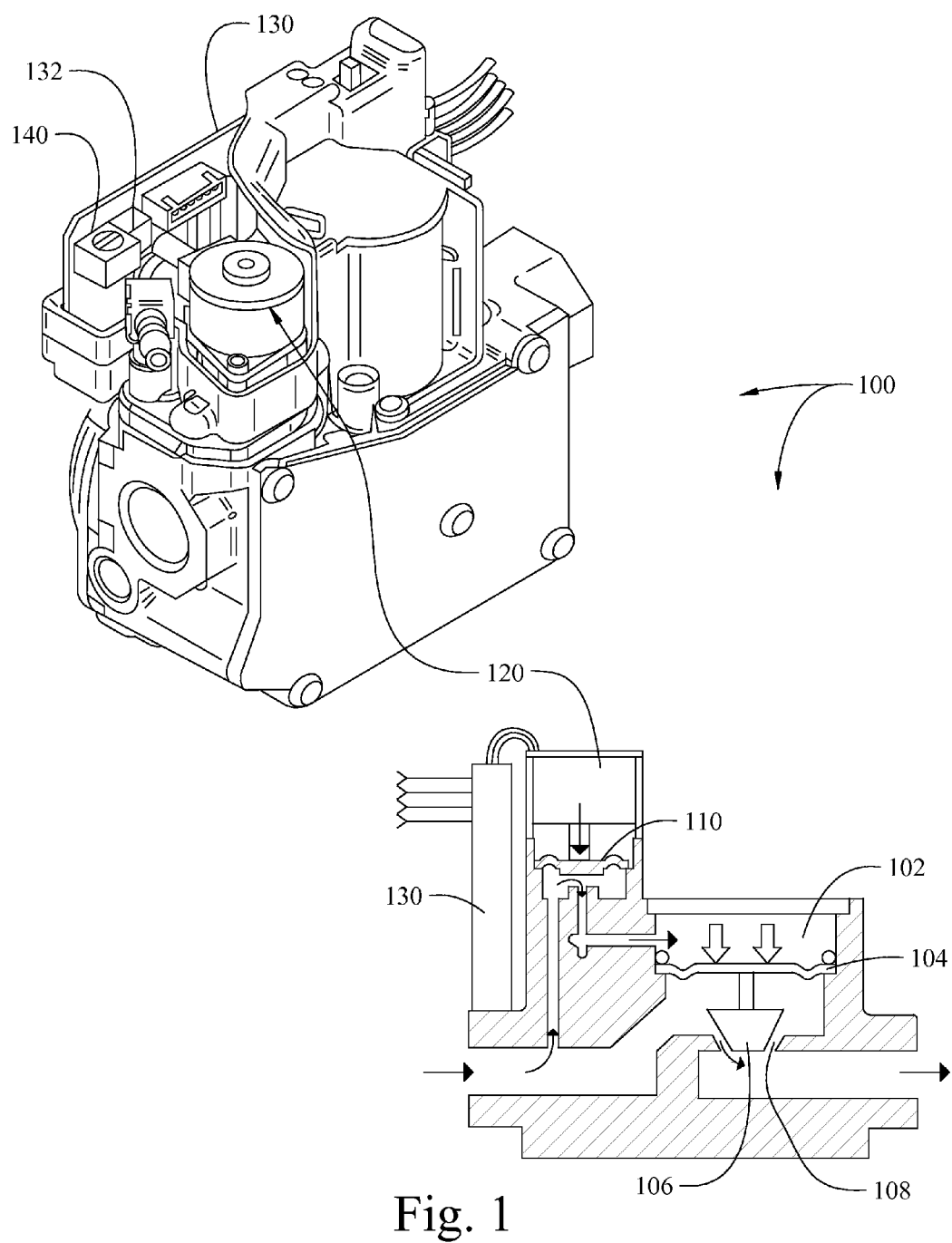
FIG. 1 shows a perspective view and a schematic cut-away view of one embodiment of a stepper-motor regulated gas valve control according to the present disclosure.

The following description is merely exemplary in nature and is not intended to limit the present disclosure, application, or uses. It should be understood that throughout the drawings, corresponding reference numerals indicate like or corresponding parts and features.

In one embodiment, a stepper-motor regulated gas valve control 100 is provided as shown in FIG. 1. The stepper-motor regulated gas valve control 100 includes a main diaphragm chamber 102, and a main diaphragm 104 disposed in the main diaphragm chamber 102. The main diaphragm 104 controllably displaces a valve 106 relative to a valve opening 108 in response to changes in pressure in the main diaphragm chamber 102, to thereby permit adjustment of the flow of fuel through the valve opening 108. The stepper-motor regulated gas valve control 100 further includes a servo-regulator diaphragm 110, which is configured to regulate fluid flow to the main diaphragm chamber 102. The servo-regulator diaphragm therefore controls the fluid pressure applied to the main diaphragm, to control the rate of fuel flow through the valve opening 108. The stepper-motor regulated gas valve control 100 also includes a stepper motor 120 configured to move in a stepwise manner to displace the servo-regulator diaphragm 110, for regulating fluid flow to the diaphragm chamber 102 to thereby regulate the rate of fuel flow through the valve 106.

The first embodiment accordingly provides for stepper-motor control over the extent of opening of the valve 108, to provide modulated fuel flow operation. The first embodiment of a gas valve control 100 is governed by a stepper motor 120, rather than a voice coil operator that is typically used in modulating controls for modulating the position of a valve. The typical modulating valve employing a voice coil operator is driven by a milliamp signal ranging from 0 to 180 milliamps, which causes the voice coil to move a distance that is proportional to the amount of milliamps conducted in the coil. Modulating furnaces typically have a furnace controller that determines the extent of heating operation required, and generates a milliamp signal corresponding to the desired degree of heating, to provide a corresponding degree of fuel flow. For example, a typical modulating furnace controller may generate a 180 milliamp signal where maximum heating capacity operation is desired, and may generate a 20 milliamp signal where minimum heating operation is desired. However, such a heating demand signal is not applicable to a stepper-motor operator, which is displaced based on a required number of steps.

The stepper-motor regulated gas valve control 100 preferably includes a controller or control circuit 130 configured to receive an input control signal, from which a reference value of between 0 and 5 volts is obtained. The control circuit 130 is configured to determine a select motor step value that corresponds to the obtained reference value, and to move the stepper-motor 120 a number of steps corresponding to the selected motor step value, which displaces the servo-regulator diaphragm 110 and thereby controls the rate of fuel flow through the valve opening 108.

Figure 2:
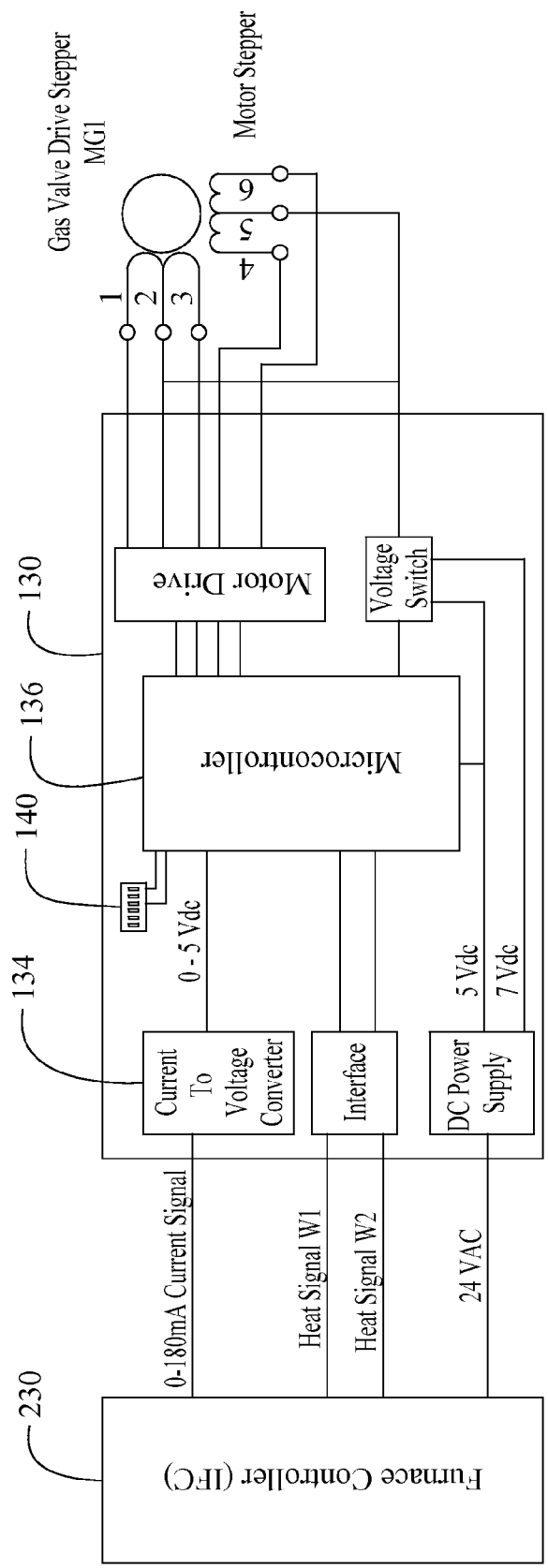
FIG. 2 shows one embodiment of a control circuit for use in connection with a stepper-motor regulated gas valve system according to the present disclosure.

The first embodiment of a stepper-motor regulated gas valve control 100 is preferably configured to employ a control circuit 130 as shown in FIG. 2.

The control circuit 130 includes a microprocessor 136 in communication with a current to voltage converter circuitry 134 that converts a milliamp signal provided by a modulating furnace control 230, which signal ranges from 0 to 180 milliamps to a 0 to 5 volt (direct current) reference signal. The reference signal value is used to determine a motor step value, which is used to determine the number of steps the motor must turn or move to set the servo-regulator diaphragm 110 to the requested fuel level. The stepper motor gas valve control 100 uses the select motor step value to drive the stepper-motor 120 in a step-wise manner, to the desired stepper motor position, which causes the stepper-motor 120 to displace the servo-regulator diaphragm 110 the desired distance and thereby regulate the output of the valve. The control circuit 130 also includes a dip switch for adjusting the number of steps taken by the stepper-motor 120. The dip switch may be a linear six position dip switch 140 as depicted in FIG. 2, or a rotary dip switch 140 and two-position jumper 132 as shown in FIG. 1. The dip switch position or setting is used to add or subtract a number of steps, such as increasing the number of steps to switch from Natural gas to Liquid Propane gas.

Accordingly, in the first embodiment of a stepper-motor regulated gas valve control 100, the control receives an input control signal that is a milliamp signal in the range of from 0 to 180 milliamps. The control circuit 130 is configured to convert the received signal from a value of between 0 and 180 milliamps to a corresponding reference value of between 0 and 5 volts. However, the control circuit 130 for the stepper-motor regulated gas valve control 100 may also be configured to convert a pulse width modulated signal to a 0 to 5 volt reference signal, from which a motor step value may be determined.

In the first embodiment of a stepper-motor regulated gas valve control 100, the control circuit 130 may employ a lookup table having a set of motor step values, which are used to determine the appropriate number of steps the stepper motor 120 must move. The look-up table includes a set of motor step values that correspond to a number of reference values spanning the range of between 0 and 5 volts, wherein the control circuit 130 is configured to determine an appropriate motor step amount by selecting a motor step value from the look up table that corresponds to the reference value obtained from the input control signal. This conversion and determination of a step value allows the stepper motor valve to be operated by a furnace control designed for a modulating valve having a voice-coil operated by a 180 milliamp signal.

Figure 3:
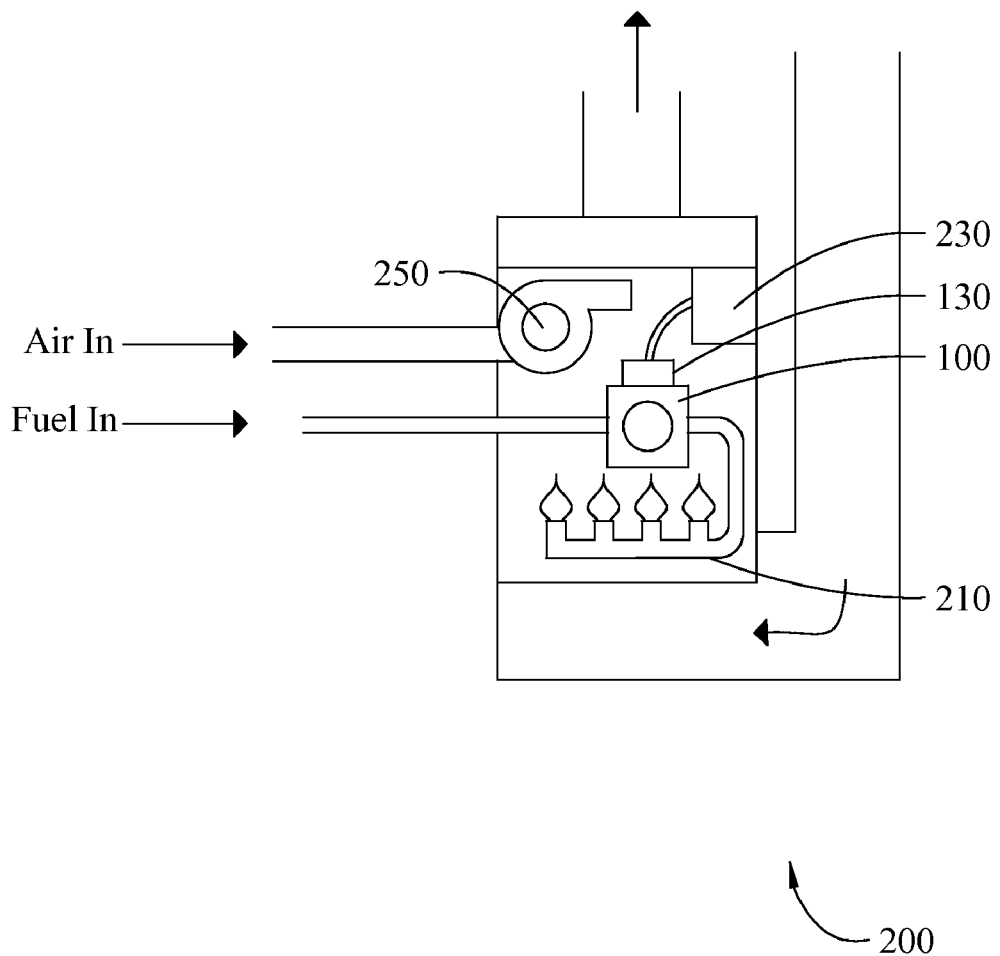
FIG. 3 shows an embodiment of a fuel-fired heating system that is supplied with fuel by one embodiment of a stepper motor regulated gas valve control.
Figure 4:
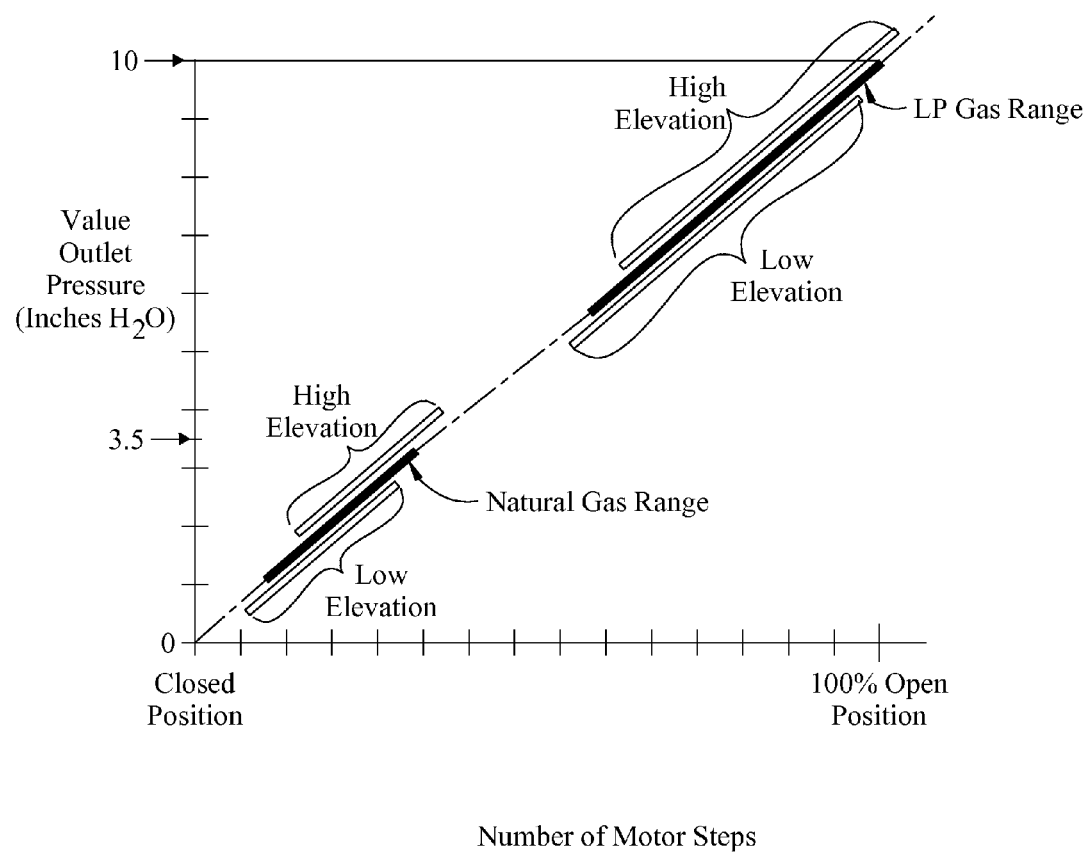
FIG. 4 shows a graph illustrating the relationship between the pressure of Natural Gas versus Liquid Propane gas and the corresponding number of steps of one embodiment of a stepper-motor for regulating either Natural Gas or Liquid Propane gas.

In use, the stepper-motor regulated gas valve control 100 would be included within a fuel-fired heating system 200 that includes a burner 210 that is supplied with fuel by the stepper-motor regulated gas valve control 100, as shown in FIG. 3. The fuel-fired heating system 200 further includes a system controller 230 that communicates with the controller or control circuit 130 for controlling the operation of the stepper-motor regulated gas valve control 100. The system controller 230 may also be selectively configurable by a dip switch 240 having a setting for communicating to the controller to provide one of a step-opening characteristic, a slow-opening characteristic, and a fast-opening characteristic. For example, the particular fuel-fired heating system 200 may include a system controller 230 that is selectively configured such that each time the stepper-motor regulated gas valve 100 is to be opened, the system controller 230 communicates signals to the stepper-motor regulated gas valve control 100 to gradually move the stepper-motor 120 from a closed no-flow position to a full-capacity supply of fuel flow over a minimum time interval of at least three seconds, to thereby provide a slow-opening characteristic. The system controller 230 could alternatively communicate signals to the stepper-motor regulated gas valve control 100 to move the stepper-motor 120 to full-capacity fuel flow in less than three seconds, to thereby provide a fast-opening characteristic. The stepper-motor regulated gas valve control 100 may accordingly be installed in different systems that each have a system controller 230 configured to provide a different step-opening characteristic. Accordingly, a single design for a stepper-motor regulated gas valve control 100 may advantageously be used in a number of different fuel-fired heating systems that require different operating characteristics, by employing a configurable system controller that controls the movement of a stepper-motor regulated gas valve control to achieve the desired opening characteristics.

In the above embodiment, a stepper motor gas valve control is provided in which the valve, stepper motor, and control circuit are all part of the valve product, which is designed to be retrofitted into an existing furnace having a furnace control designed for providing signals to a voice coil type modulating valve, or a pulse width modulation driven valve. In these voice coil operated valves, the milliamp signal from the existing furnace controller is converted to the number of steps required for the stepper motor driven valve to operate at the desired fuel flow rate.

It should be understood that the above stepper-motor regulated gas valve control 100 utilizes a set of motor step values that correspond to a plurality of positions of the stepper motor 120 for adjusting the regulator, which positions range between a closed no-flow position to a 100% full capacity position. The above first embodiment of a stepper-motor regulated gas valve control 100 may be employed in combination with a burner 210 that is supplied with fuel by the stepper-motor regulated gas valve control 100, and a system controller 230 in communication with the control circuit 130 for controlling the operation of the stepper-motor regulated gas valve control 100. When combined with a system controller 230, the system controller 230 may be designed to determine the number of steps for moving the stepper-motor valve when the valve is to be opened, to control the opening characteristic of the valve. More particularly, the system controller may be selectively configurable to control the movement of the stepper motor 120 to provide an opening characteristic that is a function of the valve's outlet pressure over time, as explained below.

The above first embodiment of a stepper-motor regulated gas valve 100 is capable of modulating fuel flow based on a milliamp signal communicated by a modulating furnace controller that is designed to operate a typical voice coil operated valve. Accordingly, the above stepper-motor regulated gas valve control 100 is configured to replace a conventional voice-coil operated modulating valve that was originally installed in an existing modulating furnace. In addition to the above aspects, the stepper-motor regulated gas valve control 100 may also be configured to operate with Natural Gas fuel or Liquid Propane fuel as a fuel source, as explained below. The selection of Natural Gas fuel or Liquid Propane is preferably made through a jumper that is part of the control circuit panel. For example, the positioning of the jumper to select Natural Gas establishes an electrical connection of an impedance in the circuit that provides the 0 to 5 volt reference value signal, which impedance causes the reference value to remain at the lower end of the 0 to 5 volt range. The positioning of the jumper to select Liquid Propane removes the impedance from the circuit that provides the 0 to 5 volt reference value signal, which causes the reference value to be shifted towards the upper end of the 0 to 5 volt range where a greater number of "steps" would be provided. In essence, to achieve a given level of heating, the number of motor "steps" for Liquid Propane gas will be greater than the required number of motor "steps" for Natural Gas, to account for the greater density and pressure of Liquid Propane gas, as shown in FIG. 3. This selection will shift the selection of values in the look-up table from the number of steps for Natural gas to the number of steps for Liquid Propane gas. Alternatively, the Natural/LP gas selection may be made by a dip switch that is configured to provide a reference impedance value, which is read by the control circuit to shift the reference voltage value. Likewise, a dip switch selection could alternatively be used to prompt the control circuit to select motor step values from a second look-up table corresponding to the second fuel.

The first embodiment of a stepper motor valve control may also be configured to provide for adjustment of the valve's outlet pressure to set the valve for different altitudes. This adjustment is preferably accomplished by a setting on a dip switch. Similar to the manner of shifting the reference voltage value described above, the dip switch setting alters the control circuit to cause the reference voltage to shift within the 0 to 5 volt range, to thereby adjust the required number of motor steps up or down from a nominal value. This adjustment of the valve's outlet pressure by shifting the motor step value permits setting fuel flow for altitude to achieve a near-stoichiometric fuel to air combustion ratio. In addition to adjusting the valve flow, an orifice (not shown) at the burner is also typically changed when switching between Natural gas and Liquid Propane gas.

Figure 5:
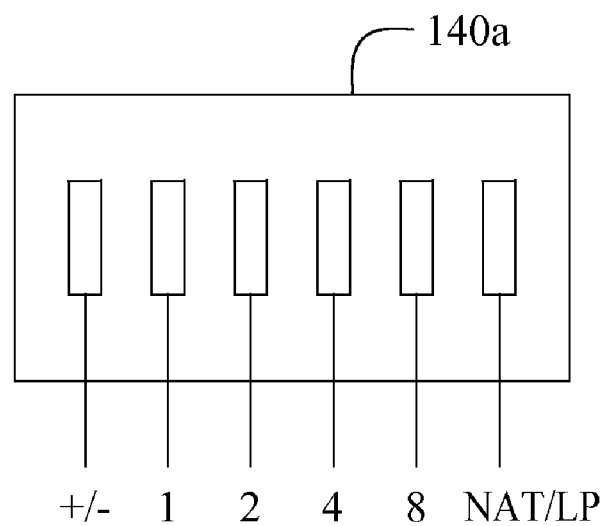
FIG. 5 shows one embodiment of a position switch for use in connection with a stepper-motor regulated gas valve system according to the present disclosure.
Figure 6:
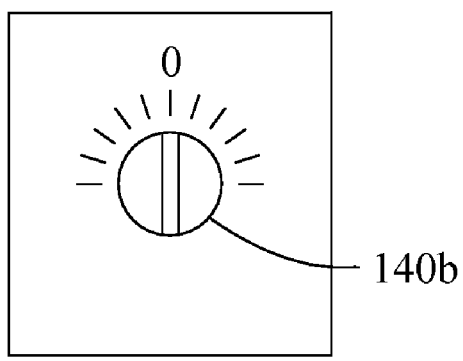
FIG. 6 shows a second embodiment of a position switch for use in connection with a stepper-motor regulated gas valve system according to the present disclosure.

As shown in FIG. 5, one embodiment of a dip switch 140 may comprise a rotary dip switch 140a that adds a number of steps when turned one direction (such as increasing 5 steps for Natural gas to 12 steps for Liquid Propane gas), and decrements the number of steps when turned the opposite direction. In another embodiment, the dip switch may be a linear six position dip switch 140b as depicted in FIG. 6, which is used to select whether to add or decrement the offset, the value or number of steps of the offset, and whether the valve was set for use with Natural or Liquid Propane gas. As shown in FIG. 5, the first position of dip switch 140a, indicated by the +/−, would select whether the set number of steps would be added to or subtracted from the requested steps of the motor. The next four positions are used for selecting the value or number of steps in the offset, where the four positions are cumulated. The position indicated by 1, 2, 4, and 8 would each respectively add 1 step, 2 steps, 4 steps or 8 steps. Thus, if the "1" and "4" dip switches were set on, the offset would be 5, and if the "1", "2" and "4" dip switches were set on, the offset would be 7. If the "1", "2", "4" and "8" dip switches were set on, the offset would be 15, the maximum number of steps. The last dip switch position would be used to select whether the gas valve was set for use with Natural or Liquid Propane gas, which setting could be compared with the gas setting selected on the ignition control for verification of a correct setting. In the event of an inconsistency, the ignition control would not operate until the inconsistency is corrected.

In another embodiment, the linear dip switch in FIG. 6 could alternatively be a rotary dip switch 140b as shown in FIG. 6, which may provide a corresponding number of positions. For example, the rotary dip switch 140b may have positions 0 through F, which could provide up to a value of 15 in Hex. In this case, the rotary switch is set at a zero position, and rotation of the switch determines if the change is − or +, depending on which way you turn the switch. The number of steps per position is also programmable, so that rotation by one position may be two motor steps For example, the zero or nominal position of the rotary switch may be assigned a nominal value of 8, and the number of positions the rotary switch is rotated would be multiplied by a per-step value such as 2. Thus, rotation by two steps below the zero position of the rotary switch would result in the nominal value of 8 being decremented by 4, for a value of 4. Similarly, rotation by three steps above the zero position of the rotary switch would result in the nominal value of 8 being incremented by 6, for a value of 14. Thus, a microprocessor reading the value of the rotary dip switch would determine if the switch has been rotated from the nominal position (based on switch position), whether the rotation was − or +, and would multiply the number of rotated positions by the per step value, to determine the total offset to add or subtract in arriving at a motor offset value. In this manner, the rotary switch may simply be rotated counter-clockwise or clockwise, to intuitively increase or decrease the motor step offset value. With regard to the selection of Natural or Liquid Propane gas, this selection is made with a two-position dip switch.

In another aspect of the present disclosure, various embodiments of a stepper-motor regulated gas valve control 100 that are adaptable for a number of different fuel-fired furnaces are provided. In a second embodiment of a stepper-motor regulated gas valve control shown in FIG. 5, the control may be advantageously used in a variety of furnaces with different operating or opening characteristics. The stepper-motor regulated gas valve control 100 comprises a main diaphragm chamber 102, and a main diaphragm 104 in the main diaphragm chamber 102 that controllably displaces a valve relative to a valve opening 108 in response to changes in pressure in the main diaphragm chamber, to thereby permit adjustment of the flow of fuel through the valve opening. The stepper-motor regulated gas valve control 100 includes a servo-regulator diaphragm 110 configured to regulate fluid flow to the main diaphragm chamber 102 to thereby control the rate of fuel flow through the valve. The stepper-motor regulated gas valve control 100 further includes a stepper motor 120 configured to move in a stepwise manner to displace the servo-regulator diaphragm 110 for regulating fluid flow to the diaphragm chamber 102, to thereby regulate the rate of fuel flow through the valve opening 108.

The second embodiment of a stepper-motor regulated gas valve control 100 includes a controller mounted on the stepper-motor regulated gas valve control 100 that receives an input control signal ranging from 0 to 180 milliamps. Such a signal is typically employed by voice-coil operated modulating valves. The controller is configured to convert a signal value of between 0 and 180 milliamps to a proportionally corresponding reference value of between 0 and 5 volts. The controller further includes a look-up table with a set of motor step values that correspond to a number of reference values between 0 and 5 volts. The controller is configured to select a motor step value from the look up table that corresponds to the reference value obtained from the input control signal, and to move the stepper-motor in a step wise manner to the selected motor step value, to displace the servo-regulator diaphragm and thereby regulate the rate of fuel flow through the valve opening. The set of motor step values correspond to a plurality of positions of the stepper motor for adjusting the regulator, with the plurality of positions ranging from a closed no-flow position to a full capacity position. Accordingly, the stepper motor is movable to a plurality of positions for establishing a number of outlet flow levels ranging from a flow of at least 10% capacity to 100% full-flow capacity. The controller is preferably disposed on the stepper-motor regulated gas valve, but could alternatively be incorporated within a system controller 230.

In the second embodiment, the stepper-motor regulated gas valve control 100 is employed in combination with a burner that is supplied with fuel by the stepper-motor regulated gas valve control 100, and a system controller 230 that employs the control circuit 130 for controlling the operation of the stepper-motor regulated gas valve control 100. When combined with a system controller 230, the system controller 230 may be designed to determine the number of steps for moving the stepper-motor valve when the valve is to be opened, to control the opening characteristic of the valve. More particularly, the system controller 230 may be selectively configurable to control the movement of the stepper motor 120 to provide an opening characteristic as a function of the valve's outlet pressure over time.

The system controller 230 is selectively configured such that each time the stepper-motor regulated gas valve is opened, the system controller 230 may incrementally move the stepper-motor 120 to provide an initial low pressure supply of fuel and within a short interval thereafter move the stepper motor 120 to provide an increased higher pressure supply of fuel, to thereby provide a step-opening characteristic. Alternatively, the system controller 230 may be selectively configured to such that each time the stepper-motor regulated gas valve is opened, the system controller 230 gradually moves the stepper-motor 120 from a closed no-flow position to a full-capacity supply of fuel flow over a minimum time interval of at least three seconds, to thereby provide a slow-opening characteristic. Similarly, the system controller 230 may be selectively configured such that each time the stepper-motor 120 regulated gas valve is opened the system controller 230 moves the stepper-motor 120 from a closed no-flow position to a full-capacity supply of fuel flow in less than a three second time interval, to thereby provide a fast-opening characteristic. Accordingly, by employing the stepper-motor gas valve control of the present invention, a system controller 230 may be selectively configurable by a dip switch having a setting for a step-opening characteristic, a slow-opening characteristic, and a fast-opening characteristic.

The above configurable system controller 230 would allow one stepper-motor gas valve control "SKU" to take the place of multiple step-open, slow-open, or fast-open valve types, by obtaining the opening rate and timing from the furnace or system controller 230 each time the gas valve is to be opened. The system controller 230 could provide theses parameter to the stepper motor gas valve control at the beginning of each heating cycle.

Accordingly, a valve is provided that has a stepper motor 120, for which an opening curve as a function of pressure and time can be communicated to the stepper-motor gas valve control via a furnace or system controller 230. The system controller 230 is in turn programmed by the manufacturer of the furnace at the time the system is assembled and tested. In this situation, the control circuit 130 for the stepper-motor gas valve control could be incorporated into the furnace or system controller 230, such that the gas valve only includes a stepper motor 120. Accordingly, at least one embodiment of a system controller is provided that is configured to control the operation of a stepper motor, and that is also selectively configurable to provide at least one opening profile selected from the group consisting of a step-opening profile, a slow open profile, a delayed open profile, and a fast open profile.

According to yet another aspect, various embodiments of a fuel-fired heating system comprising a stepper-motor regulated gas valve control is provided. In one embodiment of a fuel-fired heating system having a stepper-motor regulated gas valve controller, the fuel-fired system includes a burner for receiving the supply of fuel flow for combustion in a fuel-fired heating apparatus. The fuel-fired heating system further comprises a stepper motor regulated gas valve control for supplying fuel flow to the burner, which includes a main diaphragm chamber, and a main diaphragm in the main diaphragm chamber. The main diaphragm controllably displaces a valve relative to a valve opening in response to changes in pressure in the main diaphragm chamber, to thereby permit adjustment of the flow of fuel through the valve opening. The stepper motor regulated gas valve control further includes a servo-regulator diaphragm configured to regulate fluid flow to the main diaphragm chamber to thereby control the rate of fuel flow through the valve opening. The stepper motor regulated gas valve control also includes a stepper motor configured to move in a stepwise manner to displace the servo-regulator diaphragm for regulating fluid flow to the diaphragm chamber, to thereby regulate the rate of fuel flow through the valve opening. The fuel-fired heating system comprises a system controller for controlling the operation of the stepper-motor regulated gas valve control, to controllably initiate and discontinue the flow of fuel to the burner. The system controller is selectively configurable to control the movement of the stepper motor to provide an opening characteristic that is a function of the valve's outlet pressure over time. For example, the system controller may be selectively configured such that each time the stepper-motor regulated gas valve is opened, the system controller incrementally moves the stepper-motor to provide an initial low pressure supply of fuel, and within a short interval thereafter move the stepper motor to provide an increased higher pressure supply of fuel, to thereby provide a step-opening characteristic. Alternatively, the system controller may be selectively configured such that each time the stepper-motor regulated gas valve is opened, the system controller gradually moves the stepper-motor from a closed no-flow position to a full-capacity supply of fuel flow over a minimum time interval of at least three seconds, to thereby provide a slow-opening characteristic. Similarly, the system controller may be selectively configured such that each time the stepper-motor regulated gas valve is opened, the system controller moves the stepper-motor from a closed no-flow position to a full-capacity supply of fuel flow in less than three seconds time, to thereby provide a fast-opening characteristic.

What is claimed is:

1. A stepper-motor regulated gas valve control, comprising:
an inlet, an outlet, and a flow path therebetween;
a main diaphragm chamber;
a main diaphragm coupled to a valve and configured to displace the valve relative to a valve opening in response to changes in pressure in the main diaphragm chamber;
a servo-regulator diaphragm configured to regulate fluid flow to the main diaphragm chamber, to control a rate of fuel flow through the valve opening, the servo-regulator diaphragm being fluidly disconnected from the outlet when the valve is closed;
a stepper motor coupled to the servo-regulator diaphragm and configured to move in a stepwise manner to displace the servo-regulator diaphragm to selectively block fluid flow into the main diaphragm chamber; and
a control circuit coupled to the stepper motor, the control circuit configured to receive an input control signal having a current between 0 and 180 milliamps, the control signal indicative of a requested fuel flow, the control circuit configured to convert the input control signal to a reference value having a voltage between 0 and 5 volts, the control circuit configured to determine a motor step value that corresponds to the converted reference value, and the control circuit configured to energize the stepper motor according to the determined motor step value, to thereby regulate the rate of fuel flow through the valve opening.

2. The stepper-motor regulated gas valve control of claim 1, wherein the control circuit includes a look-up table, which includes a set of motor step values that correspond to a number of reference values, wherein the control circuit is configured to select the motor step value from the look up table that corresponds to the converted reference value.

3. The stepper-motor regulated gas valve control of claim 2, wherein the set of motor step values correspond to a plurality of positions of the stepper motor, said plurality of positions ranging from a closed no-flow position to a full capacity position.

4. A heating system comprising the stepper-motor regulated gas valve control of claim 1 and a system controller that employs the control circuit for controlling the operation of the stepper-motor regulated gas valve control.

5. The heating system of claim 4, wherein the system controller is selectively configurable to control the movement of the stepper motor to provide an opening characteristic that is a function of the valve's outlet pressure over time.

6. The heating system of claim 5, wherein the system controller is selectively configured such that each time the stepper-motor regulated gas valve is opened, the system controller incrementally moves the stepper motor to provide an initial low pressure supply of fuel and within an interval thereafter moves the stepper motor to provide an increased higher pressure supply of fuel, to thereby provide a step-opening characteristic.

7. The heating system of claim 5, wherein the system controller is selectively configured such that each time the stepper-motor regulated gas valve is opened, the system controller gradually moves the stepper motor from a closed no-flow position to a full-capacity supply of fuel flow over a minimum time interval of at least three seconds, to thereby provide a slow-opening characteristic.

8. The heating system of claim 5, wherein the system controller is selectively configured such that each time the stepper-motor regulated gas valve is opened, the system controller moves the stepper motor from a closed no-flow position to a full-capacity supply of fuel flow in less than a three second time interval, to thereby provide a fast-opening characteristic.

9. The heating system of claim 5, where the system controller is selectively configurable by a dip switch having a setting for at least one of a step-opening characteristic, a slow-opening characteristic, and a fast-opening characteristic.

10. The stepper-motor regulated gas valve control of claim 3, wherein said control circuit is disposed on the stepper-motor regulated gas valve.

11. A fuel-fired heating system comprising:
a burner for receiving a supply of fuel flow for combustion in a fuel-fired heating apparatus;
a furnace control for communicating a requested fuel flow;
a stepper-motor regulated gas valve control for supplying fuel flow to the burner;
the stepper-motor regulated gas valve control including:
an inlet, an outlet, and a flow path therebetween;
a main diaphragm chamber;
a main diaphragm in the main diaphragm chamber that controllably displaces a valve relative to a valve opening in response to changes in pressure in the main diaphragm chamber, to thereby permit adjustment of the flow of fuel through the valve opening;
a servo-regulator diaphragm configured to selectively block fluid flow into the main diaphragm chamber to thereby control the rate of fuel flow through the valve opening, the servo-regulator diaphragm being fluidly disconnected from the outlet when the valve is closed;
a stepper motor coupled to the servo-regulator diaphragm and configured to move in a stepwise manner to displace the servo-regulator diaphragm for regulating fluid flow to the main diaphragm chamber, to thereby regulate the rate of fuel flow through the valve opening; and
a system controller coupled to the stepper motor and the furnace control, the system controller configured to receive an input control having a current between 0 and 180 milliamps from the furnace control, the input control signal indicative of the requested fuel flow through the valve, the system controller configured to control the movement of the stepper motor, based on the input control signal, to provide an opening characteristic of the valve that is a function of the valve's outlet pressure over time.

12. The fuel-fired heating system of claim 11, wherein the system controller is selectively configured such that each time the stepper-motor regulated gas valve is opened the system controller incrementally moves the stepper motor to provide an initial low pressure supply of fuel and within an interval thereafter move the stepper motor to provide an increased higher pressure supply of fuel, to thereby provide a step-opening characteristic.

13. The fuel-fired heating system of claim 11, wherein the system controller is selectively configured such that each time the stepper-motor regulated gas valve is opened the system controller gradually moves the stepper motor from a closed no-flow position to a full-capacity supply of fuel flow over a minimum time interval of at least three seconds, to thereby provide a slow-opening characteristic.

14. The fuel-fired heating system of claim 11, wherein the system controller is selectively configured such that each time the stepper-motor regulated gas valve is opened the system controller moves the stepper motor from a closed no-flow position to a full-capacity supply of fuel flow in less than a three second time interval, to thereby provide a fast-opening characteristic.

15. A method for controlling fluid flow through a stepper-motor gas valve of a heating system, the stepper-motor gas valve including a main diaphragm chamber, a main diaphragm coupled to a valve and configured to displace the valve relative to a valve opening in response to changes in pressure in the main diaphragm chamber, a servo-regulator diaphragm configured to regulate fluid flow to the main diaphragm chamber and to be fluidly disconnected from an outlet of the gas valve when the valve is closed, and a stepper motor coupled to the servo-regulator diaphragm, the method comprising:
receiving an input control signal from a furnace control of the heating system, the input control signal having a current in the range between 0 and 180 milliamps, the input control signal indicative of a requested fluid flow;
converting the input control signal to a reference value between 0 and 5 volts, the reference value representative of the input control signal;
determining a motor step value based on the reference value and a type of the fluid source coupled to the valve; and
based on the motor step value, causing the stepper motor to displace the servo-regulator diaphragm to selectively block fluid flow into the main diaphragm chamber, to thereby provide the requested fluid flow through the stepper-motor gas valve.

16. The method of claim 15, wherein determining the motor step value includes selecting the motor step value from a plurality of motor step values, the plurality of motor step values including a first motor step value associated with a closed no-flow position and a second motor step value associated with a full capacity position.

17. The method of claim 15, wherein determining the motor step value is further based on a fuel source.

18. The method of claim 15, wherein:
determining the motor step value includes selecting the motor step value from a plurality of motor step values, the plurality of motor step values including a first motor step value associated with a closed no-flow position and a second motor step value associated with a full capacity position; and
the method includes causing the stepper motor to displace the servo-regulator diaphragm in a closed position in which the servo-regulator blocks fluid flow to the main diaphragm chamber when the first motor step value associated with the closed no-flow position is selected.

19. The method of claim 15, wherein the method includes:
gradually moving the stepper motor from a closed no-flow position to a full-capacity supply of fuel flow over a minimum time interval of at least three seconds, to thereby provide a slow-opening characteristic; and/or
moving the stepper motor from a closed no-flow position to a full-capacity supply of fuel flow in less than a three second time interval, to thereby provide a fast-opening characteristic.

20. The stepper-motor regulated gas valve control of claim 1, wherein the stepper motor is configured to move in a stepwise manner to displace the servo-regulator diaphragm to selectively block all fluid flow into the main diaphragm chamber.

21. The stepper-motor regulated gas valve control of claim 1, wherein the motor step value further corresponds to a valve outlet pressure in a first range of about 0.50 inches $H_2O$ to about 4.0 inches $H_2O$ for natural gas and a second range of about 5.0 inches $H_2O$ to about 11.0 inches $H_2O$ for liquid propane gas.

22. The stepper-motor regulated gas valve control of claim 1, wherein:
the stepper-motor regulated gas control valve is configured to be selectively operable with first and second different types of fuel sources; and
the control circuit is configured to determine the motor step value based on the type of fuel source, whereby the motor step value for the first type of fuel source is different than the motor step value of the second type of fuel source to account for differences in fuel densities and/or pressures.

23. The stepper-motor regulated gas valve control of claim 1, wherein the stepper-motor regulated gas control valve is configured to provide for adjustment of valve outlet pressure to set the valve for different altitudes.

24. The method of claim 15, wherein determining a motor step value based on the reference value and a type of the fluid source coupled to the valve comprises determining a motor step value that corresponds to a valve outlet pressure in a first range of about 0.50 inches $H_2O$ to about 4.0 inches $H_2O$ for a first type of fluid from the fluid source and a second range of about 5.0 inches $H_2O$ to about 11.0 inches $H_2O$ for a second type of fluid from the fluid source.

* * * * *

UNITED STATES PATENT AND TRADEMARK OFFICE
CERTIFICATE OF CORRECTION

| | | |
|---|---|---|
| PATENT NO. | : 8,381,760 B2 | |
| APPLICATION NO. | : 12/172444 | |
| DATED | : February 26, 2013 | |
| INVENTOR(S) | : Mike C. Santinanavat et al. | |

It is certified that error appears in the above-identified patent and that said Letters Patent is hereby corrected as shown below:

On the title page item (75) should read

(75) Inventors: Mike C. Santinanavat, St. Louis, MO (US)
William P. Butler, St. Louis, MO (US)
Jagdish Atri, St. Louis, MO (US)
Ryan Jensen, St. Louis, MO (US)

Signed and Sealed this
Second Day of April, 2013

Teresa Stanek Rea
*Acting Director of the United States Patent and Trademark Office*